United States Patent
Li

(10) Patent No.: US 11,416,365 B2
(45) Date of Patent: Aug. 16, 2022

(54) METHOD AND SYSTEM FOR OPEN NAND BLOCK DETECTION AND CORRECTION IN AN OPEN-CHANNEL SSD

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 44 days.

(21) Appl. No.: 17/138,007

(22) Filed: Dec. 30, 2020

(65) Prior Publication Data
US 2022/0206915 A1    Jun. 30, 2022

(51) Int. Cl.
| G06F 11/30 | (2006.01) |
| G06F 11/07 | (2006.01) |
| G06F 11/10 | (2006.01) |
| G06F 7/58 | (2006.01) |
| G06F 3/06 | (2006.01) |

(52) U.S. Cl.
CPC .......... *G06F 11/3034* (2013.01); *G06F 3/064* (2013.01); *G06F 3/0619* (2013.01); *G06F 3/0631* (2013.01); *G06F 3/0688* (2013.01); *G06F 7/582* (2013.01); *G06F 11/0757* (2013.01); *G06F 11/1004* (2013.01); *G06F 11/1076* (2013.01)

(58) Field of Classification Search
CPC ............. G06F 11/3034; G06F 11/0757; G06F 11/1004; G06F 11/1076
See application file for complete search history.

(56) References Cited

U.S. PATENT DOCUMENTS

| 3,893,071 A | 7/1975 | Bossen |
| 4,562,494 A | 12/1985 | Bond |
| (Continued) | | |

FOREIGN PATENT DOCUMENTS

| JP | 2003022209 | 1/2003 |
| JP | 2011175422 | 9/2011 |
| (Continued) | | |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Nadeem Iqbal
(74) *Attorney, Agent, or Firm* — Shun Yao; Yao Legal Services, Inc.

(57) ABSTRACT

One embodiment provides a system which facilitates data management. The system allocates a superblock of a storage device, wherein the superblock is in an open state. The system writes data to the superblock. The system monitors, by a controller of the storage device, an amount of time that the superblock remains in the open state. Responsive to detecting a failure associated with a flash translation layer (FTL) module, the system determines that the monitored amount of time exceeds a predetermined threshold, and seals, by the controller, the superblock by writing directly to a respective free page in the superblock while bypassing one or more data-processing modules.

20 Claims, 9 Drawing Sheets

(56) References Cited

U.S. PATENT DOCUMENTS

| | | | |
|---|---|---|---|
| 4,718,067 | A | 1/1988 | Peters |
| 4,775,932 | A | 10/1988 | Oxley |
| 4,858,040 | A | 8/1989 | Hazebrouck |
| 5,394,382 | A | 2/1995 | Hu |
| 5,602,693 | A | 2/1997 | Brunnett |
| 5,715,471 | A | 2/1998 | Otsuka |
| 5,732,093 | A | 3/1998 | Huang |
| 5,802,551 | A | 9/1998 | Komatsu |
| 5,930,167 | A | 7/1999 | Lee |
| 6,098,185 | A | 8/2000 | Wilson |
| 6,148,377 | A | 11/2000 | Carter |
| 6,226,650 | B1 | 5/2001 | Mahajan et al. |
| 6,243,795 | B1 | 6/2001 | Yang |
| 6,457,104 | B1 | 9/2002 | Tremaine |
| 6,658,478 | B1 | 12/2003 | Singhal |
| 6,795,894 | B1 | 9/2004 | Neufeld |
| 7,351,072 | B2 | 4/2008 | Muff |
| 7,565,454 | B2 | 7/2009 | Zuberi |
| 7,599,139 | B1 | 10/2009 | Bombet |
| 7,953,899 | B1 | 5/2011 | Hooper |
| 7,958,433 | B1 | 6/2011 | Yoon |
| 8,085,569 | B2 | 12/2011 | Kim |
| 8,144,512 | B2 | 3/2012 | Huang |
| 8,166,233 | B2 | 4/2012 | Schibilla |
| 8,260,924 | B2 | 9/2012 | Koretz |
| 8,281,061 | B2 | 10/2012 | Radke |
| 8,452,819 | B1 | 5/2013 | Sorenson, III |
| 8,516,284 | B2 | 8/2013 | Chan |
| 8,527,544 | B1 | 9/2013 | Colgrove |
| 8,751,763 | B1 | 6/2014 | Ramarao |
| 8,819,367 | B1 | 8/2014 | Fallone |
| 8,825,937 | B2 | 9/2014 | Atkisson |
| 8,832,688 | B2 | 9/2014 | Tang |
| 8,868,825 | B1 | 10/2014 | Hayes |
| 8,904,061 | B1 | 12/2014 | O'Brien, III |
| 8,949,208 | B1 | 2/2015 | Xu |
| 9,015,561 | B1 | 4/2015 | Hu |
| 9,031,296 | B2 | 5/2015 | Kaempfer |
| 9,043,545 | B2 | 5/2015 | Kimmel |
| 9,088,300 | B1 | 7/2015 | Chen |
| 9,092,223 | B1 | 7/2015 | Pani |
| 9,129,628 | B1 | 9/2015 | Fallone |
| 9,141,176 | B1 | 9/2015 | Chen |
| 9,208,817 | B1 | 12/2015 | Li |
| 9,213,627 | B2 | 12/2015 | Van Acht |
| 9,280,472 | B1 | 3/2016 | Dang |
| 9,280,487 | B2 | 3/2016 | Candelaria |
| 9,311,939 | B1 | 4/2016 | Malina |
| 9,336,340 | B1 | 5/2016 | Dong |
| 9,436,595 | B1 | 9/2016 | Benitez |
| 9,495,263 | B2 | 11/2016 | Pang |
| 9,529,601 | B1 | 12/2016 | Dharmadhikari |
| 9,529,670 | B2 | 12/2016 | O'Connor |
| 9,575,982 | B1 | 2/2017 | Sankara Subramanian |
| 9,588,698 | B1 | 3/2017 | Karamcheti |
| 9,588,977 | B1 | 3/2017 | Wang |
| 9,607,631 | B2 | 3/2017 | Rausch |
| 9,671,971 | B2 | 6/2017 | Trika |
| 9,747,202 | B1 | 8/2017 | Shaharabany |
| 9,852,076 | B1 | 12/2017 | Garg |
| 9,875,053 | B2 | 1/2018 | Frid |
| 9,912,530 | B2 | 3/2018 | Singatwaria |
| 9,946,596 | B2 | 4/2018 | Hashimoto |
| 10,013,169 | B2 | 7/2018 | Fisher |
| 10,037,152 | B2* | 7/2018 | Li ............ G06F 13/4068 |
| 10,199,066 | B1 | 2/2019 | Feldman |
| 10,229,735 | B1 | 3/2019 | Natarajan |
| 10,235,198 | B2 | 3/2019 | Qiu |
| 10,268,390 | B2 | 4/2019 | Warfield |
| 10,318,467 | B2 | 6/2019 | Barzik |
| 10,361,722 | B2 | 7/2019 | Lee |
| 10,437,670 | B1 | 10/2019 | Koltsidas |
| 10,459,663 | B2 | 10/2019 | Agombar |
| 10,642,522 | B2 | 5/2020 | Li |
| 10,649,657 | B2 | 5/2020 | Zaidman |
| 10,678,432 | B1 | 6/2020 | Dreier |
| 10,756,816 | B1 | 8/2020 | Dreier |
| 10,928,847 | B2 | 2/2021 | Suresh |
| 11,163,494 | B2* | 11/2021 | Jung ............ G06F 3/0604 |
| 2001/0032324 | A1 | 10/2001 | Slaughter |
| 2002/0010783 | A1 | 1/2002 | Primak |
| 2002/0039260 | A1 | 4/2002 | Kilmer |
| 2002/0073358 | A1 | 6/2002 | Atkinson |
| 2002/0095403 | A1 | 7/2002 | Chandrasekaran |
| 2002/0112085 | A1 | 8/2002 | Berg |
| 2002/0161890 | A1 | 10/2002 | Chen |
| 2003/0074319 | A1 | 4/2003 | Jaquette |
| 2003/0145274 | A1 | 7/2003 | Hwang |
| 2003/0163594 | A1 | 8/2003 | Aasheim |
| 2003/0163633 | A1 | 8/2003 | Aasheim |
| 2003/0217080 | A1 | 11/2003 | White |
| 2004/0010545 | A1 | 1/2004 | Pandya |
| 2004/0066741 | A1 | 4/2004 | Dinker |
| 2004/0103238 | A1 | 5/2004 | Avraham |
| 2004/0143718 | A1 | 7/2004 | Chen |
| 2004/0255171 | A1 | 12/2004 | Zimmer |
| 2004/0267752 | A1 | 12/2004 | Wong |
| 2004/0268278 | A1 | 12/2004 | Hoberman |
| 2005/0038954 | A1 | 2/2005 | Saliba |
| 2005/0097126 | A1 | 5/2005 | Cabrera |
| 2005/0138325 | A1 | 6/2005 | Hofstee |
| 2005/0144358 | A1 | 6/2005 | Conley |
| 2005/0149827 | A1 | 7/2005 | Lambert |
| 2005/0174670 | A1 | 8/2005 | Dunn |
| 2005/0177672 | A1 | 8/2005 | Rao |
| 2005/0177755 | A1 | 8/2005 | Fung |
| 2005/0195635 | A1 | 9/2005 | Conley |
| 2005/0235067 | A1 | 10/2005 | Creta |
| 2005/0235171 | A1 | 10/2005 | Igari |
| 2006/0031709 | A1 | 2/2006 | Hiraiwa |
| 2006/0101197 | A1 | 5/2006 | Georgis |
| 2006/0156012 | A1 | 7/2006 | Beeson |
| 2006/0184813 | A1 | 8/2006 | Bui |
| 2007/0033323 | A1 | 2/2007 | Gorobets |
| 2007/0061502 | A1 | 3/2007 | Lasser |
| 2007/0101096 | A1 | 5/2007 | Gorobets |
| 2007/0250756 | A1 | 10/2007 | Gower |
| 2007/0266011 | A1 | 11/2007 | Rohrs |
| 2007/0283081 | A1 | 12/2007 | Lasser |
| 2007/0283104 | A1 | 12/2007 | Wellwood |
| 2007/0285980 | A1 | 12/2007 | Shimizu |
| 2008/0034154 | A1 | 2/2008 | Lee |
| 2008/0065805 | A1 | 3/2008 | Wu |
| 2008/0082731 | A1 | 4/2008 | Karamcheti |
| 2008/0112238 | A1 | 5/2008 | Kim |
| 2008/0163033 | A1 | 7/2008 | Yim |
| 2008/0301532 | A1 | 12/2008 | Uchikawa |
| 2009/0006667 | A1 | 1/2009 | Lin |
| 2009/0089544 | A1 | 4/2009 | Liu |
| 2009/0113219 | A1 | 4/2009 | Aharonov |
| 2009/0125788 | A1 | 5/2009 | Wheeler |
| 2009/0183052 | A1 | 7/2009 | Kanno |
| 2009/0254705 | A1 | 10/2009 | Abali |
| 2009/0282275 | A1 | 11/2009 | Yermalayeu |
| 2009/0287956 | A1 | 11/2009 | Flynn |
| 2009/0307249 | A1 | 12/2009 | Koifman |
| 2009/0307426 | A1 | 12/2009 | Galloway |
| 2009/0310412 | A1 | 12/2009 | Jang |
| 2010/0031000 | A1 | 2/2010 | Flynn |
| 2010/0169470 | A1 | 7/2010 | Takashige |
| 2010/0217952 | A1 | 8/2010 | Iyer |
| 2010/0229224 | A1 | 9/2010 | Etchegoyen |
| 2010/0241848 | A1 | 9/2010 | Smith |
| 2010/0321999 | A1 | 12/2010 | Yoo |
| 2010/0325367 | A1 | 12/2010 | Kornegay |
| 2010/0332922 | A1 | 12/2010 | Chang |
| 2011/0031546 | A1 | 2/2011 | Uenaka |
| 2011/0055458 | A1 | 3/2011 | Kuehne |
| 2011/0055471 | A1 | 3/2011 | Thatcher |
| 2011/0060722 | A1 | 3/2011 | Li |
| 2011/0072204 | A1 | 3/2011 | Chang |
| 2011/0099418 | A1 | 4/2011 | Chen |
| 2011/0153903 | A1 | 6/2011 | Hinkle |
| 2011/0161784 | A1 | 6/2011 | Selinger |

(56) References Cited

U.S. PATENT DOCUMENTS

| | | |
|---|---|---|
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |

(56) References Cited

U.S. PATENT DOCUMENTS

| | | |
|---|---|---|
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0064288 A1* | 3/2021 | Kanno ............... G06F 3/065 |
| 2021/0089392 A1 | 3/2021 | Shirakawa |
| 2021/0103388 A1 | 4/2021 | Choi |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

(56) References Cited

OTHER PUBLICATIONS

C. Wu, D. Wu, H. Chou and C. Cheng, "Rethink the Design of Flash Translation Layers in a Component-Based View", in IEEE Acess, vol. 5, pp. 12895-12912, 2017.
Po-Liang Wu, Yuan-Hao Chang and T. Kuo, "A file-system-aware FTL design for flash-memory storage systems," 2009, pp. 393-398.
S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.
A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.
J. Jung and Y. Won, "nvramdisk: A Transactional Block Device Driver for Non-Volatile RAM", in IEEE Transactions on Computers, vol. 65, No. 2, pp. 589-600, Feb. 1, 2016.
Te I et al. (Pensieve: a Machine Assisted SSD Layer for Extending the Lifetime: (Year: 2018).
ARM ("Cortex-R5 and Cortex-R5F", Technical reference Manual, Revision r1p1) (Year:2011).

\* cited by examiner

METHOD AND SYSTEM FOR OPEN NAND BLOCK DETECTION AND CORRECTION IN AN OPEN-CHANNEL SSD

BACKGROUND

Field

This disclosure is generally related to the field of data storage. More specifically, this disclosure is related to a method and system for open NAND block detection and correction in an open-channel solid-state drive (SSD).

Related Art

Today, various storage systems are being used to store and access the ever-increasing amount of digital content. A storage system can include storage servers with one or more storage devices or drives (such as a solid-state drive (SSD)). Data can be stored in a non-volatile storage media of an SSD in physical blocks of Not-And flash (NAND) flash memory. In an open-channel SSD, the flash translation layer (FTL) module operations are performed by the host ("host-side FTL"), which allows the host to manage FTL operations such as maintaining the FTL mapping table. At the same time, issues relating to the physical NAND flash storage medium must be addressed in order to ensure performance and reliability of the overall storage system.

The host-side FTL can be a program which runs in the host. Host failures and host-side FTL program failures may affect the ability of the overall storage system to efficiently transition and recover, especially in enterprise scenarios which require 24×7 Quality of Service (QoS) standards. One area which can affect recovery is handling open NAND flash blocks in an open-channel SSD.

In order to ensure the reliability of data stored in an SSD, the system may write dummy data to open pages (e.g., blocks or superblocks which have free or available pages) and seal those pages. During normal operations of an open-channel SSD, the host-side FTL can generate the command to seal the open pages. However, when the host-side FTL crashes or experiences a failure, open blocks may stay open for longer than desired, which can increase the risk of data loss.

One current solution is to read out metadata from the SSDs in order to rebuild the FTL mapping table in host memory, while filling the open NAND blocks with dummy data in the background. However, there exists a gap in time between an FTL crash and the subsequent rebuilding of the FTL mapping table. In addition, because open NAND blocks generally have less noise immunity than sealed NAND blocks, this gap in time may result in an increased risk of data loss, which can decrease the performance and efficiency of the overall storage system.

SUMMARY

One embodiment provides a system which facilitates data management. The system allocates a superblock of a storage device, wherein the superblock is in an open state. The system writes data to the superblock. The system monitors, by a controller of the storage device, an amount of time that the superblock remains in the open state. Responsive to detecting a failure associated with a flash translation layer (FTL) module, the system determines that the monitored amount of time exceeds a predetermined threshold, and seals, by the controller, the superblock by writing directly to a respective free page in the superblock while bypassing one or more data-processing modules.

In some embodiments, the controller seals the superblock by the following operations. The system generates, for the respective free page, a pseudo-random number sequence and a first logical block address (LBA). The system writes the pseudo-random number sequence to the respective free page in the superblock. The system writes the first LBA to an end of the respective free page, wherein the first LBA indicates that the respective free page includes the pseudo-random number sequence. The system writes the first LBA in a log of the superblock, wherein the log comprises LBAs associated with the superblock. The system sets the superblock to a sealed state, wherein the pseudo-random number sequence and the first LBA are written directly to the respective free page while bypassing the one or more data-processing modules.

In some embodiments, the data-processing modules include one or more of: a cyclic redundancy check (CRC) module; a data-protecting module; a redundant array of independent disks (RAID)-encoding module; an error correction code (ECC)-encoding module; and a data-modulating module.

In some embodiments, the controller comprises a firmware component, which includes an operator component, a number generator, a watcher component, and a command component. Monitoring the amount of time that the superblock remains in the open state is performed by the watcher component, and determining that the monitored amount of time exceeds the predetermined threshold is performed by the command component.

In some embodiments, responsive to the command component determining that the monitored amount of time exceeds the predetermined threshold, the system performs the following operations. The system sends, by the command component to the operator component, a first command to seal the superblock. The system sends, by the operator component in response to the first command, a second command for the number generator component. The system generates, by the number generator in response to the second command, the pseudo-random number sequence for the respective free page in the superblock.

In some embodiments, responsive to detecting no failure associated with the FTL module, the system performs the following operations. The system determines, by the FTL module, a condition which triggers sealing the superblock. The system generates, for the respective free page in the superblock, dummy data and a first LBA. The system writes the dummy data to the respective free page. The system writes the first LBA to an end of the respective free page, wherein the first LBA indicates that the respective free page includes the dummy data. The system writes the first LBA in a log of the superblock, wherein the log comprises LBAs associated with the superblock. The system sets the superblock to a sealed state, wherein the dummy data and the first LBA are written directly to the respective free page while bypassing the one or more data-processing modules.

In some embodiments, allocating the superblock is performed by the FTL module, and the FTL module is associated with a host or an entity which is distinct from the storage device.

In some embodiments, wherein the superblock is allocated in response to a first incoming write request, and the data written to the superblock is associated with the first incoming write request.

In some embodiments, responsive to processing a second incoming write request and determining that the superblock is full, the system allocates, by the FTL module, another superblock of the storage device to which to write data associated with the second incoming write request.

BRIEF DESCRIPTION OF THE FIGURES

In the figures, like reference numerals refer to the same figure elements.

DETAILED DESCRIPTION

Figure 1B:
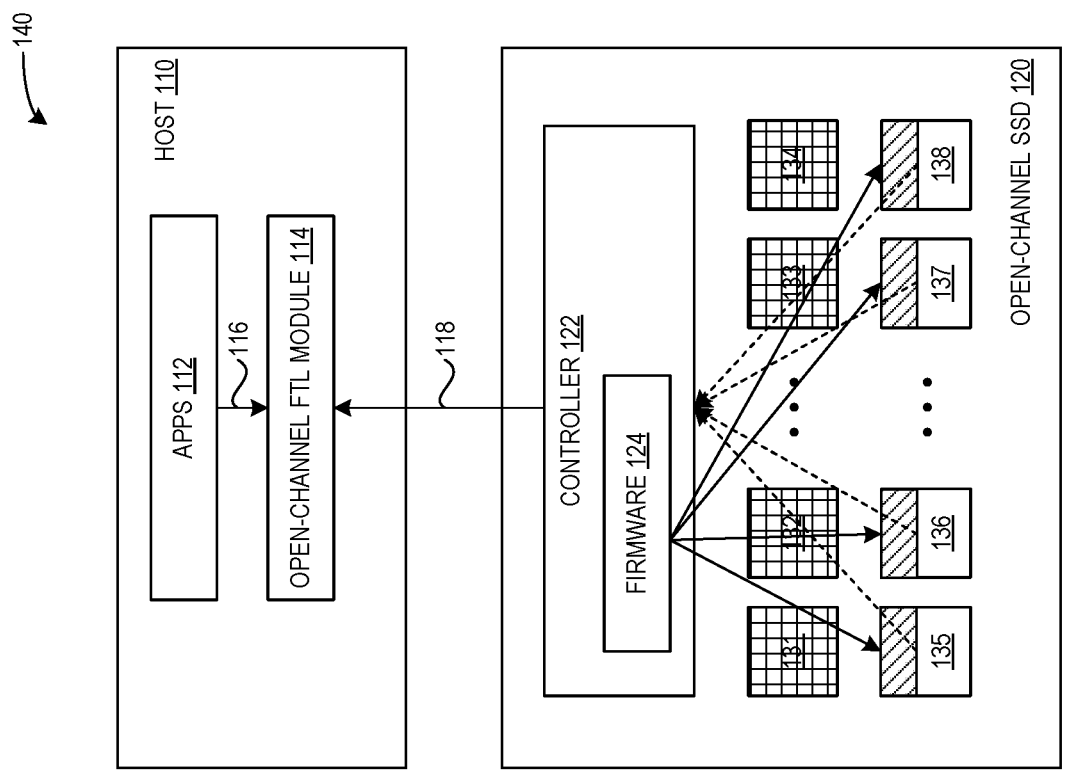
FIG. 1B illustrates an exemplary environment with a failure in a host-side FTL and management of open NAND blocks, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which addresses the inefficiencies associated with handling open NAND blocks in the event of a host-side FTL failure in an open-channel SSD.

As described above, in an open-channel SSD (with a host-side FTL), host failures and host-side FTL program failures may affect the ability of the overall storage system to efficiently transition and recover, which can include handling "open" NAND flash blocks (e.g., blocks or superblocks which have free or open pages). During normal operations of an open-channel SSD, the system can ensure the reliability of data stored in an SSD by sealing open NAND blocks (e.g., after a respective NAND block has been open for greater than a certain period of time). The host-side FTL can generate a command to seal the open pages, which can include writing dummy data to the open pages and setting the pages to a "sealed" state. However, when the host-side FTL crashes or experiences a failure, open NAND blocks may stay open for longer than desired, which can increase the risk of data loss.

One current solution is to read out metadata from the SSDs in order to rebuild the FTL mapping table in host memory, while filling the open NAND blocks with dummy data in the background, as described below in relation to FIGS. 1A and 1B. However, there exists a gap in time between an FTL crash and the subsequent rebuilding of the FTL mapping table. In addition, because open NAND blocks generally have less noise immunity than sealed NAND blocks, this gap in time may result in an increased risk of data loss, which can decrease the performance and efficiency of the overall storage system.

The embodiments described herein provide a system in which a host-side FTL collaborates with a firmware component in the SSD controller to manage the open NAND blocks in the SSD. Under normal operation of the host-side FTL program (e.g., no error or failure detected and which is associated with the host-side FTL), the host-side FTL can generate a "seal command" for an open NAND block, which results in filling the open NAND block with dummy data and setting the NAND block to a sealed state, as described below in relation to FIG. 2A.

At the same time, the firmware component can monitor the amount of time that a block (or superblock) remains in an open state. If the system detects a failure associated with the host-side FTL, the firmware component can generate the seal command for an open NAND block, as described below in relation to FIGS. 2B and 3. The firmware component can fill in the open NAND block by writing a pseudo-random number sequence (PRNS) and a first logical block address (LBA) to a respective free page. Because the PRNS and the first LBA do not contain valid data which needs to be protected, the system can perform the write of the PRNS and the first LBA as a "bypass write." That is, the system can write the PRNS and first LBA to the respective free page of the open block while bypassing one or more conventional data-processing modules, as described below in relation to FIG. 4. Moreover, the seal command generated by the host-side FTL can also write the dummy data as a bypass write.

Thus, the described embodiments provide a system in which the SSD controller monitors the amount of time that a block (or superblock) remains in an open state, and upon detecting a failure of the host-side FTL in an open-channel SSD, the SSD controller can generate the seal command as a bypass write. The firmware component of the SSD controller can function to monitor the time, generate the command, and generate the PRNS and LBA, which can result in avoiding the time- and resource-consuming FTL rebuilding procedure required in the conventional system. This in turn can result in an increase in the efficiency and performance of the overall storage system.

A "distributed storage system" or a "storage system" can include multiple storage servers. A "storage server" or a "storage system" can refer to a computing device which can include multiple storage devices or storage drives. A "storage device" or a "storage drive" refers to a device or a drive with a non-volatile memory which can provide persistent storage of data, e.g., a solid-state drive (SSD), or a flash-based storage device. A storage system can also be a computer system.

"Non-volatile memory" refers to storage media which may be used for persistent storage of data, e.g., flash memory of a NAND die of an SSD, magnetoresistive random access memory (MRAM), phase change memory (PCM), resistive random access memory (ReRAM), or another non-volatile memory.

A "computing device" refers to any server, device, node, entity, drive, or any other entity which can provide any computing capabilities.

The term "open-channel SSD" refers to a solid-state drive (SSD) whose flash translation layer (FTL) is implemented at the host side, where the host directly manages the physical NAND space. This FTL is also referred to as "host-side FTL."

The term "open NAND block" or "open NAND super-block" refers to a physical unit of a non-volatile storage media which includes one or more open or free pages.

The term "seal command" or "block-sealing command" refers to a command which includes instructions to write dummy data or a PRNS to fill the empty pages of a given open block or superblock and set the status of the subsequently filled block or superblock to a status of sealed. In this disclosure, a seal command can be generated by either a host-side FTL or a firmware component of an SSD controller.

The term "pseudo-random number sequence" (PRNS) refers to a sequence of statistically uncorrelated numbers which are generated or produced based on an algorithm.

The term "cyclic redundancy check (CRC) module" refers to a module, unit, or component which performs a CRC.

The term "error correction code (ECC)-encoding module" refers to a module, unit, or component which performs ECC.

The term "data-protecting module" refers to a module, unit, or component which performs data protection. Examples of a data-protecting module can include an erasure coding (EC) module, a redundant array of independent disks (RAID)-encoding module, and a CRC module.

The term "data-modulating module" refers to a module, unit, or component (e.g., a scrambler) which performs conversion of data signals.

The term "seal LBA" refers to an LBA which can be a predefined LBA or selected from a predetermined range of LBAs, and which can be an invalid LBA which indicates that a corresponding page or block includes dummy data or a generated PRNS.

Exemplary Data Transfer in the Prior Art

Figure 1A:
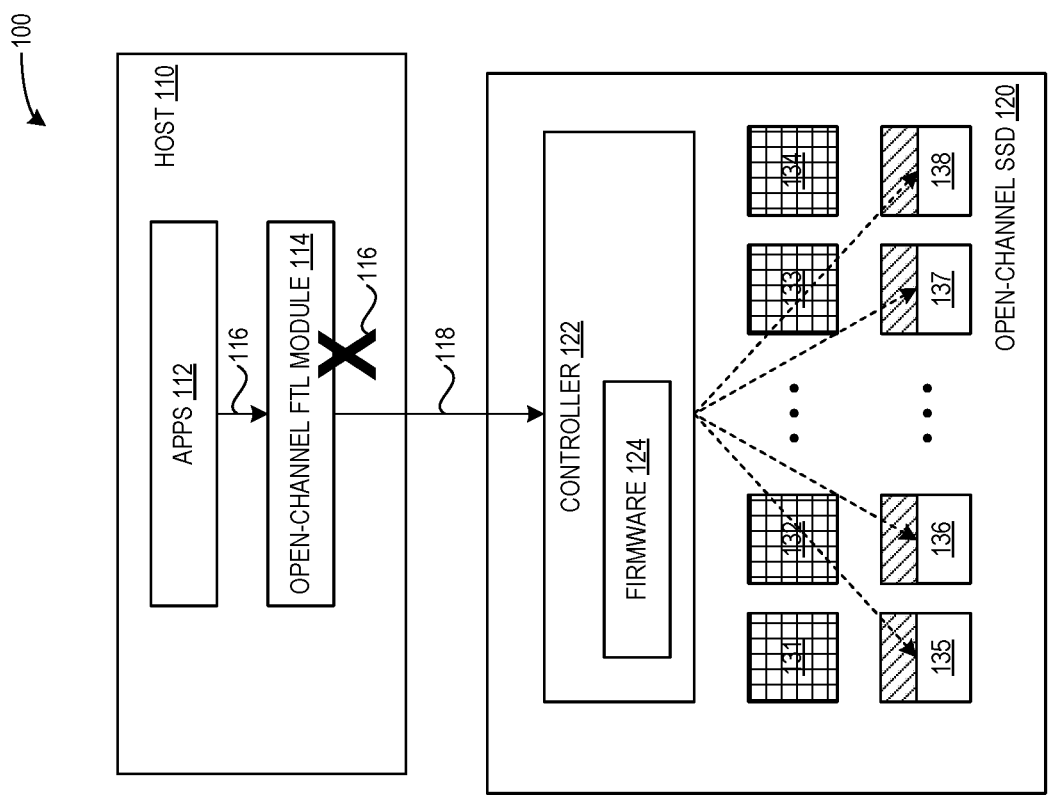
FIG. 1A illustrates an exemplary environment with a host-side FTL and management of open NAND blocks, in accordance with the prior art.

FIG. 1A illustrates an exemplary environment 100 with a host-side FTL and management of open NAND blocks, in accordance with the prior art. Environment 100 can include: a host 110 with applications ("apps") 112 and an open-channel FTL module 114; and an open-channel SSD 120 with a controller 122 and open blocks 131-138. Controller 122 can include firmware 124. During operation, apps 112 can send a request to write data (via a communication 116). Open-channel FTL module 114 can manage the mapping of logical blocks addresses (LBAs) to physical block addresses (PBAs) (or the "LBA-to-PBA mapping table" or the "FTL mapping table"). Open-channel FTL module 114 can send the PBAs and data onwards to open-channel SSD 120 (via a communication 118). Controller 122 can receive PBAs and data from host 110, and can write the data to blocks 131-138 at the correspondingly indicated PBAs, which can result in gradually filling the open blocks. For example, blocks 131-134 can be sealed blocks which are filled with data (as indicated by the vertical/horizontal cross-hatching pattern), while blocks 135-138 can be open blocks which are partially filled with data (as indicated by the right-slanting diagonal lines). The system can program the open NAND blocks. That is, data can be written to the open blocks 135-138 (via the four dashed arrows from controller 122 to each of open blocks 135-138).

If the system detects an error 116 (or other error, failure, crash, or problem) associated with FTL module 114, such as indicated by the bold "X," the SSD must read out the metadata stored in the NAND blocks in order to rebuild the FTL mapping table which is stored in the host memory (and not accessible due to error 116). At the same time, the system can fill the NAND blocks with dummy data in the background, as indicated below in relation to FIG. 1B.

FIG. 1B illustrates an exemplary environment 140 with a failure in a host-side FTL and management of open NAND blocks, in accordance with the prior art. The communications depicted in environment 140 can occur subsequent to the system detecting error 116 of FIG. 1A. Open-channel SSD 120 can read out metadata from its NAND blocks. For example, controller 122 can read out metadata from open blocks 135-138 (via the four dashed arrows from each of open blocks 135-138 to controller 122). Based on the read-out metadata, controller 122 can rebuild the FTL mapping table. At the same time, open-channel SSD 120 can fill open NAND blocks 135-138 with dummy data as part of background operations (via the four solid arrows from firmware component 124 to each of open blocks 135-138).

However, as described above, in the conventional system, the detection and correction of open NAND blocks generally relies mainly on the procedure of rebuilding the FTL mapping table. Thus, there exists a gap in time between an FTL crash (e.g., error 116) and the subsequent rebuilding of the FTL mapping table (as indicated in FIG. 1B). Because open NAND blocks generally have less noise immunity than sealed NAND blocks, this gap in time may result in an increased risk of data loss, which can decrease the performance and efficiency of the overall storage system.

Figure 2B:
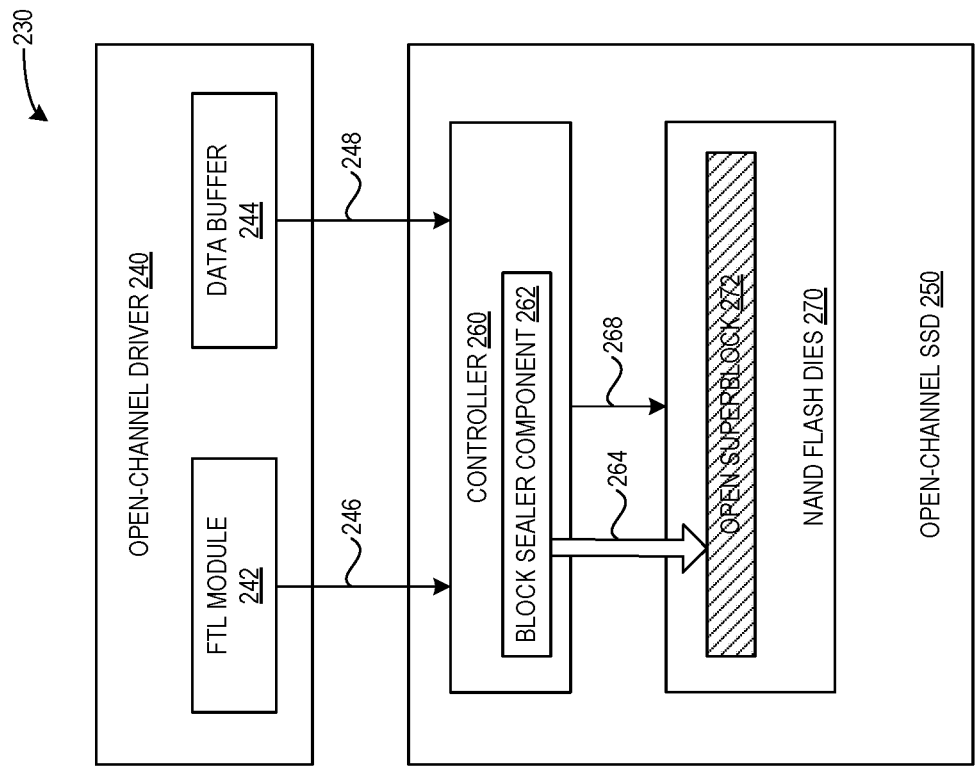
FIG. 2B illustrates an exemplary environment with block sealing performed by a controller of the storage device, in accordance with an embodiment of the present application.
Figure 2A:
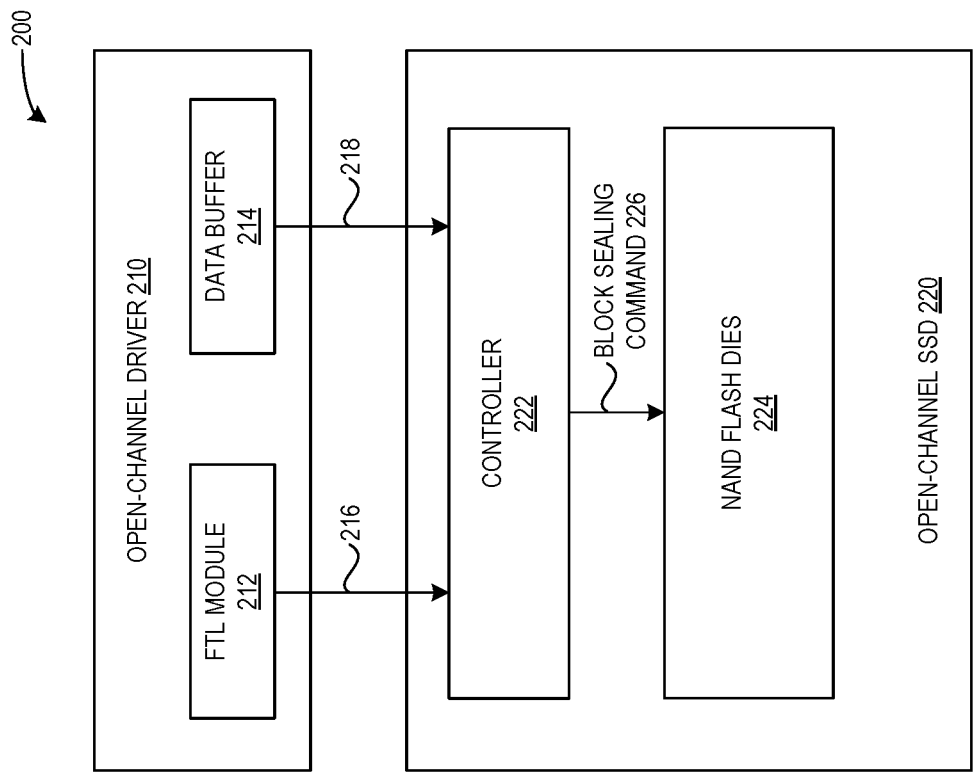
FIG. 2A illustrates an exemplary environment with block sealing, in accordance with the prior art.

Block-Sealing in the Prior Art Vs. Embodiment with Firmware Component in SSD Controller FIG. 2A illustrates an exemplary environment 200 with block sealing, in accordance with the prior art. Environment 200 can include: an open-channel driver 210 with an FTL module 212 and a data buffer 214; and an open-channel SSD 220 with a controller 222 and NAND flash dies 224.

During operation, open-channel driver 210, by FTL module 212, can send the necessary metadata information, such as a PBA associated with an open block in NAND flash dies 224 (via a communication 216). In addition, open-channel driver 210, by data buffer 214, can send dummy data as needed (e.g., corresponding to a block-sealing command from FTL module 212) to fill an open NAND block as part of the block-sealing command. For example, controller 222 can receive a block-sealing command from open-channel driver 210 (along with an indicator of the block to be sealed and dummy data to write to the block to be sealed). Controller 222 can send a block-sealing command 226 to NAND flash dies 224, which results in writing the dummy data received from data buffer 214 (via a communication 218) to the given block to be sealed in NAND flash dies 224. These communications correspond to the prior art environments depicted above in relation to FIGS. 1A and 1B, and can result in an increased risk of data loss. This in turn can decrease the performance and efficiency of the overall storage system.

The embodiments described herein provide a mechanism to solve the above-described issues by utilizing joint operations from the host-side FTL and a firmware component of the controller of the SSD. FIG. 2B illustrates an exemplary environment 230 with block sealing performed by a controller of the storage device, in accordance with an embodiment of the present application. Environment 230 can include: an open-channel driver 240 with an FTL module 242 and a data buffer 244; and an open-channel SSD 250 with a controller 260 and NAND flash dies 270. Controller 260 can include a block sealer component 262, which can be implemented as a firmware component, unit, or module. NAND flash dies 270 can include an open superblock 272, indicated with right-slanting diagonal lines.

During operation, similar to environment 200, open-channel driver 240, by FTL module 242, can send the necessary metadata information, such as a PBA associated with an open block in NAND flash dies 270 (via a communication 246). In addition, open-channel driver 240, by data buffer 244, can send dummy data as needed (e.g., corresponding to a block-sealing command from FTL module 242) to fill an open NAND block as part of the block-sealing command. For example, controller 260 can receive a block-sealing command from open-channel driver 240 (along with an indicator of the block to be sealed and dummy data to write to the block to be sealed). Controller 260 can send, via a communication 268, a block-sealing command to NAND flash dies 270, which results in writing the dummy data received from data buffer 244 (via a communication 248) to the given block to be sealed in NAND flash dies 224.

At the same time, block sealer component 262 of controller 262 can also issue a block-sealing command based on certain triggered conditions or circumstances, as described below in relation to FIG. 3. Thus, in environment 230, open-channel SSD 250 need not rely only on FTL module 242 to issue the block-sealing command. If FTL module 242 experiences a crash or other failure, block sealer component 262 can also issue the block sealing command directly to NAND flash dies 270 (e.g., via a communication 264 to open superblock 272). This can result in eliminating the time gap between an FTL crash and the successful FTL mapping table rebuild, during which time the lessened noise immunity of the open NAND blocks can expose the data to an increased risk of loss. By eliminating the time gap, the described embodiments can result in decreasing the risk of loss of data in the open NAND blocks, which in turn can increase the performance, reliability, and efficiency of the overall storage system.

Figure 3:
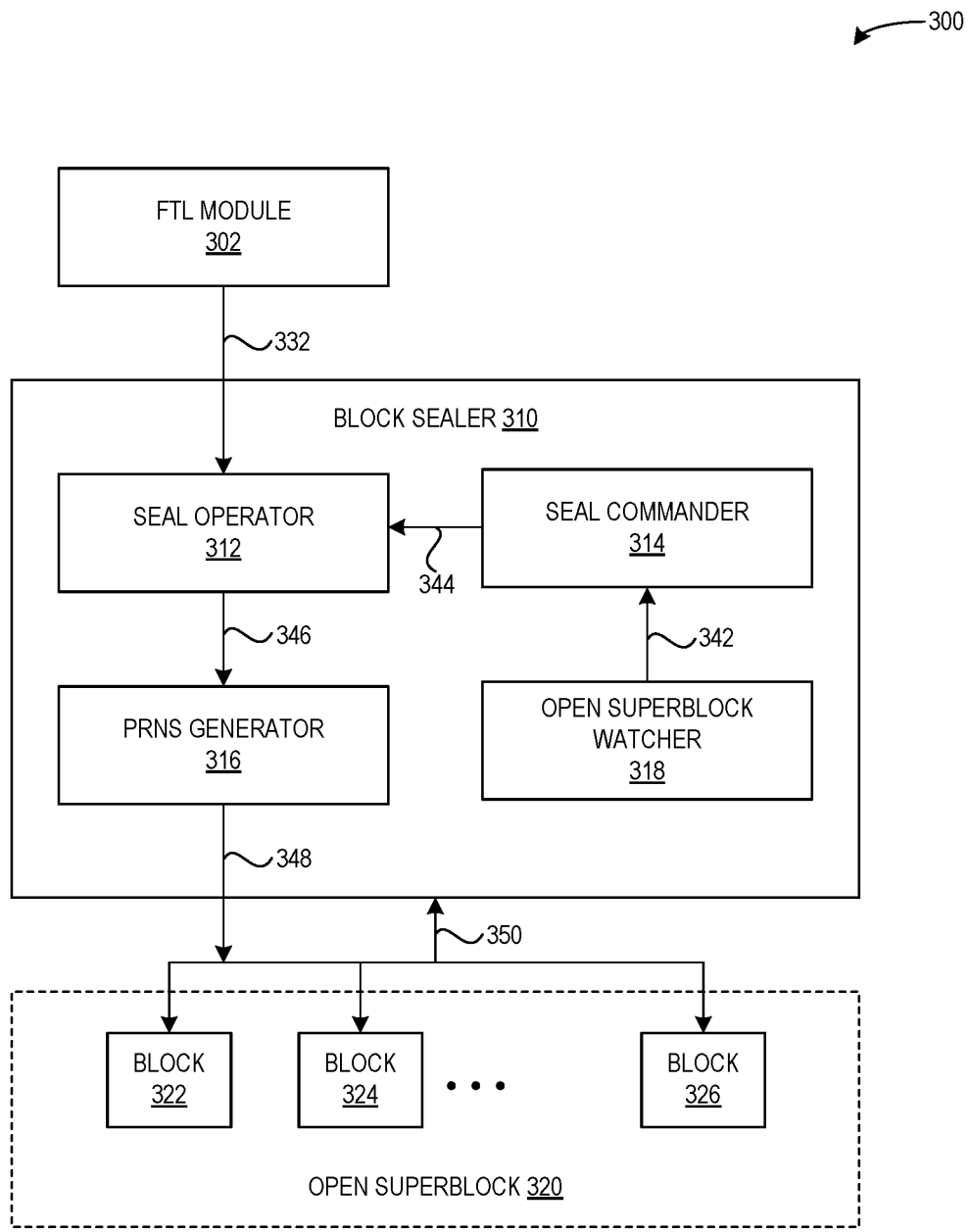
FIG. 3 illustrates an exemplary firmware component of a controller of the storage device, including block-sealing operations, in accordance with an embodiment of the present application.

Exemplary Architecture of Block-Sealing Operations in Firmware Component of SSD Controller FIG. 3 illustrates an environment 300 with an exemplary firmware component of a controller of the storage device, including block-sealing operations, in accordance with an embodiment of the present application. Environment 300 can include: an FTL module 302 (e.g., a host-side FTL); a block sealer component 310 of a controller of an SSD; and an open superblock 320 of the SSD with blocks 322, 324, and 326. Block sealer component 310 can include: a seal operator 312; a PRNS generator 316; a seal commander 314; and an open superblock watcher 318.

During operation, FTL module 302 can send a seal command to block sealer 310 (via a communication 332). Seal operator 312 can receive the command, and transmit the command to PRNS generator 316 (via a communication 346). PRNS generator 316 can generate dummy data, e.g., a PRNS, and send the PRNS (along with a corresponding PBA and other necessary information) to the storage device, to be written to free pages of a given block or blocks of open superblock 320 (via a communication 348). Once the dummy data is written to the free pages of the given block or blocks, the system can seal the open superblock.

At the same time, open superblock watcher 318 of block sealer 310 can monitor the status of an open superblock (e.g., open superblock 320), based on statistics about the superblock as observed and monitored from the time superblock 320 is first allocated and set to an open state. Open superblock watcher 318 can also reset the statistics for superblock 320 when superblock 320 is sealed (either as part of a normal write operation or as part of dummy data writing). Open superblock watcher 318 can send information to seal commander 314 (via a communication 342). Seal commander 314 can implement a time-out schedule to seal the open blocks before the open blocks are adversely affected by an amount of noise which results in an out-of-control error rate, e.g., an error rate which is greater than a predetermined rate.

If block sealer 310 detects an error associated with FTL module 302, or if block sealer 310 determines that an open block has remained in an open state for longer than a predetermined threshold, seal commander 314 can generate a seal command and send the seal command to seal operator 312 (via a communication 344). The operation can proceed as described above, e.g.: seal operator 312 can receive the block-sealing command from seal commander 314, and transmit the command to PRNS generator 316 (via communication 346); PRNS generator 316 can generate a PRNS, and send the PRNS (along with a corresponding PBA and other necessary information) to the storage device, to be written to free pages of a given block or blocks of open superblock 320 (via communication 348). Once the PRNS is written to the free pages of the given block or blocks, the system can seal the open superblock.

Bypass Write of Dummy Data to Seal Blocks

Figure 4:
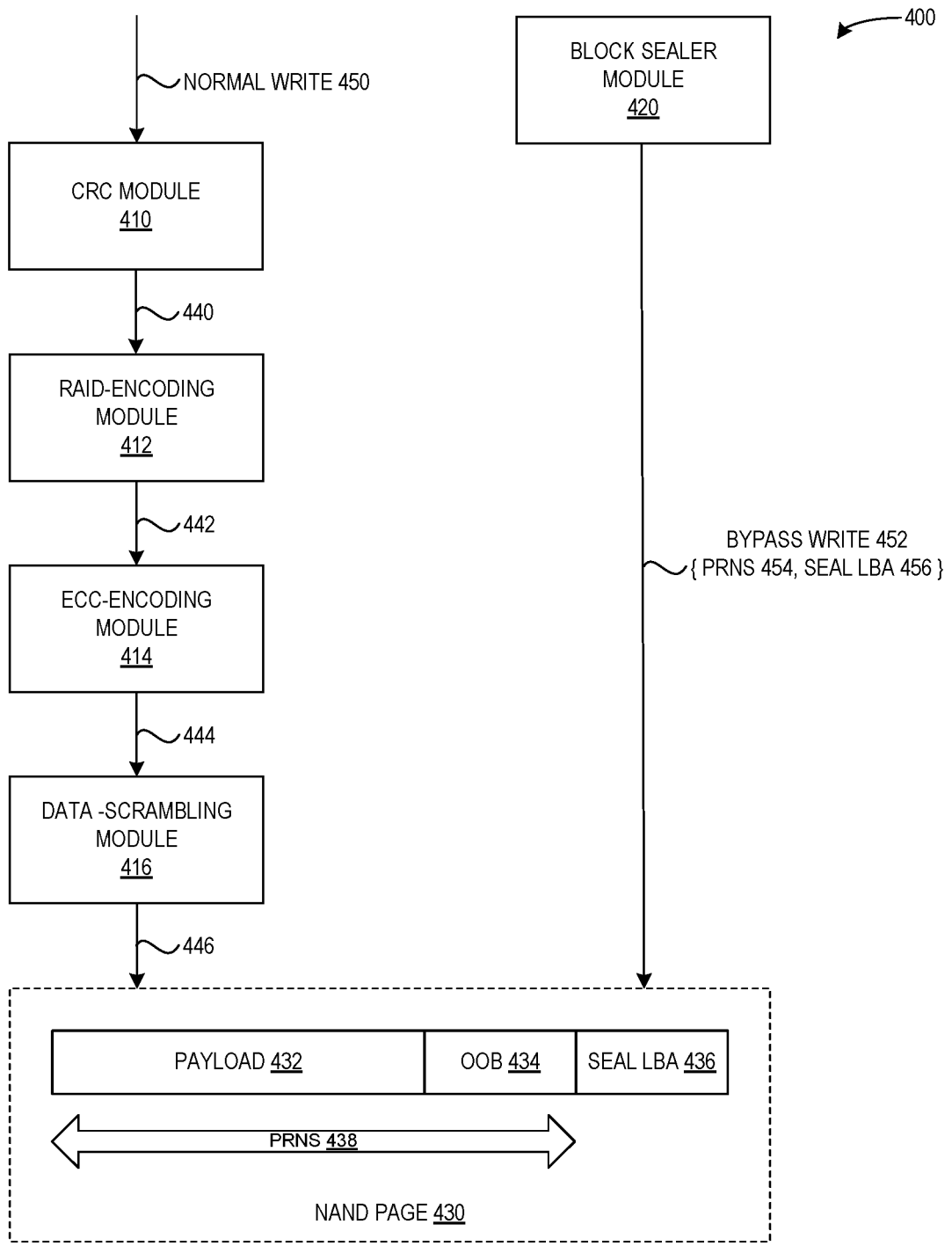
FIG. 4 illustrates a diagram of an exemplary bypass write of dummy data to seal blocks, in accordance with an embodiment of the present application.

FIG. 4 illustrates a diagram 400 of an exemplary bypass write of dummy data to seal blocks, in accordance with an embodiment of the present application. Diagram 400 can include communications related to a normal write 450 and a bypass write 452. During a normal write operation 450, data can pass through several data-processing modules before being written to NAND page 430. For example, data can be transmitted to and received by a cyclic redundancy check (CRC) module 410, which can perform a CRC operation on the data. The data can then be transmitted to RAID-encoding module 412 (via a communication 440), which can perform data-protecting operations. The data can then be transmitted from RAID-encoding module 412 to ECC-encoding module 414 (via a communication 442). ECC-encoding module 414 can perform an ECC encoding on the data. The data can then be transmitted from ECC-encoding module 414 to data-scrambling module 416 (via a communication 444). Data-scrambling module 416 can perform any data modulating or scrambling operations as needed. The data can then be transmitted from data scrambling module 416 to NAND page 430 (via a communication 446), to be written as part of payload 432.

However, recall that dummy data or PRNS (which is used to fill free pages and seal open NAND blocks) includes data which does not necessarily need to be protected, as the data has no meaning. Thus, it is not necessary to send the data through these various data-processing modules in order to ensure data correctness, as users will not access the pages which are filled with dummy data or PRNS. Thus, in order to save on the consumption of both time and resources in the storage device and the overall storage system, the described embodiments can perform bypass write 452.

That is, block sealer module 420 can directly write the dummy data and a "seal LBA" to the free pages of an open NAND block or superblock. A seal LBA can be an invalid LBA which indicates that the respective page or block includes the PRNS or other dummy data. For example, block sealer module 420 can perform bypass write 452 by writing PRNS 454 and a seal LBA 456 to a NAND page 430. PRNS 454 can be of a size sufficient to fill a payload 432 and an out-of-band (OOB) region 434, as indicated by the range shown of PRNS 438. In some embodiments, the PRNS fills only a portion of payload 432 and OOB 434, e.g., when NAND page 430 includes partial data or is already partially filled.

Furthermore, seal LBA 456 can be written to or as a seal LBA 436. The system can write the seal LBA in two places: at the end of a current page which is filled with PRNS or dummy data; and in an LBA log of a journal for the corresponding superblock. The system can also write the seal LBA to the FTL mapping table. The seal LBA which is stored at the end of the current NAND page can be protected with a repeating code without complex coding in order to ensure its correctness.

Exemplary Method for Facilitating Data Management

Figure 5:
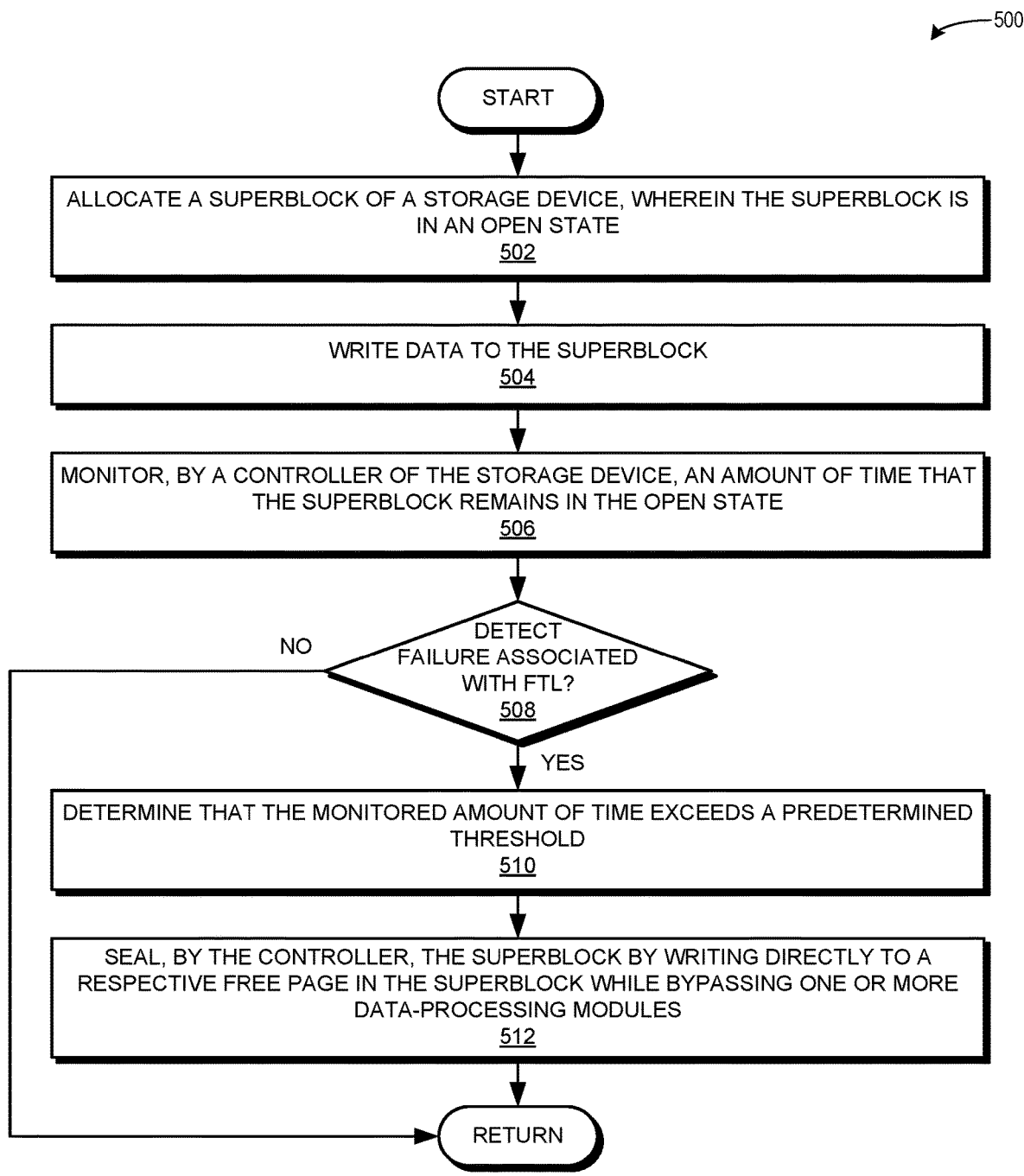
FIG. 5 presents a flowchart illustrating a method for facilitating data management, in accordance with an embodiment of the present application.

FIG. 5 presents a flowchart illustrating a method 500 for facilitating data management, in accordance with an embodiment of the present application. During operation, the system allocates a superblock of a storage device, wherein the superblock is in an open state (operation 502). The system writes data to the superblock (operation 504). The system monitors, by a controller of the storage device, an amount of time that the superblock remains in the open state (operation 506). If the system does not detect a failure associated with the flash translation layer (FTL) module (decision 508), the operation returns.

If the system detects a failure associated with the FTL module (decision 508), (responsive to detecting the failure), the system determines that the monitored amount of time exceeds a predetermined threshold (operation 510). The controller seals the superblock by writing directly to a respective free page in the superblock while bypassing one or more data-processing modules (operation 512) (as described above in relation to bypass write 452 of FIG. 4).

Figure 6A:
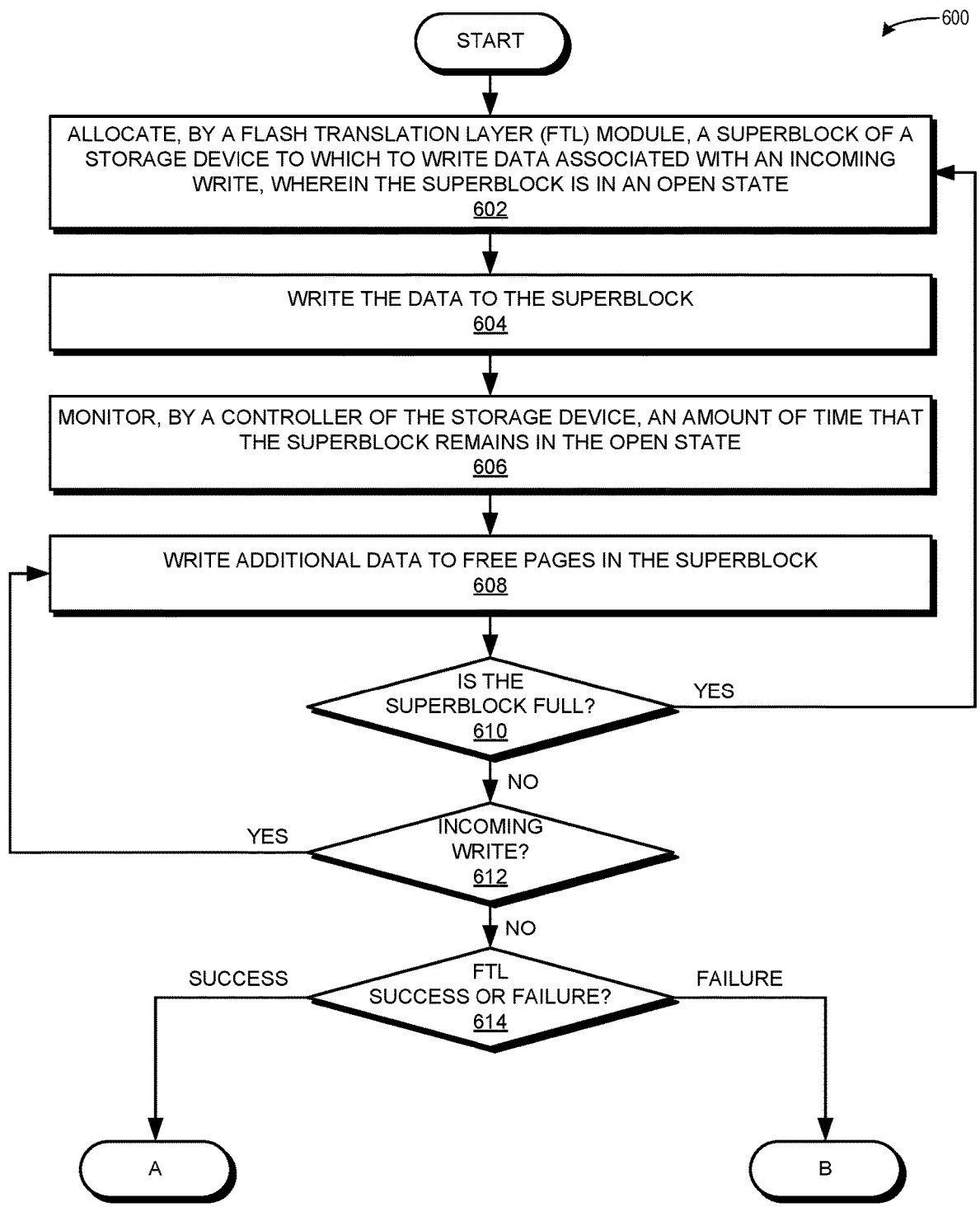
FIG. 6A presents a flowchart illustrating a method for facilitating data management, in accordance with an embodiment of the present application.

FIG. 6A presents a flowchart 600 illustrating a method for facilitating data management, in accordance with an embodiment of the present application. During operation, the system allocates, by a flash translation layer (FTL) module, a superblock of a storage device to which to write data associated with an incoming write, wherein the superblock is in an open state (operation 602). The system writes the data to the superblock (operation 604). The system monitors, by a controller of the storage device, an amount of time that the superblock remains in the open state (operation 606). The system writes additional data to free pages in the superblock (operation 608). If the superblock is full (decision 610), the operation returns to operation 602, where the FTL module allocates another superblock. If the superblock is not full (decision 610) and the system is processing an incoming write (decision 612), the operation returns to operation 608 (where the system writes additional data to the free pages in the superblock).

If the superblock is not full (decision 610) and the system is not processing an incoming write (decision 612), the system can determine or detect a failure associated with the FTL module. If the system does not detect an FTL failure (i.e., detects an FTL success or normal FTL operations) (decision 614), the operation continues at Label A of FIG. 6B. If the system does detect an FTL failure (decision 614), the operation continues at Label B of FIG. 6B.

Figure 6B:
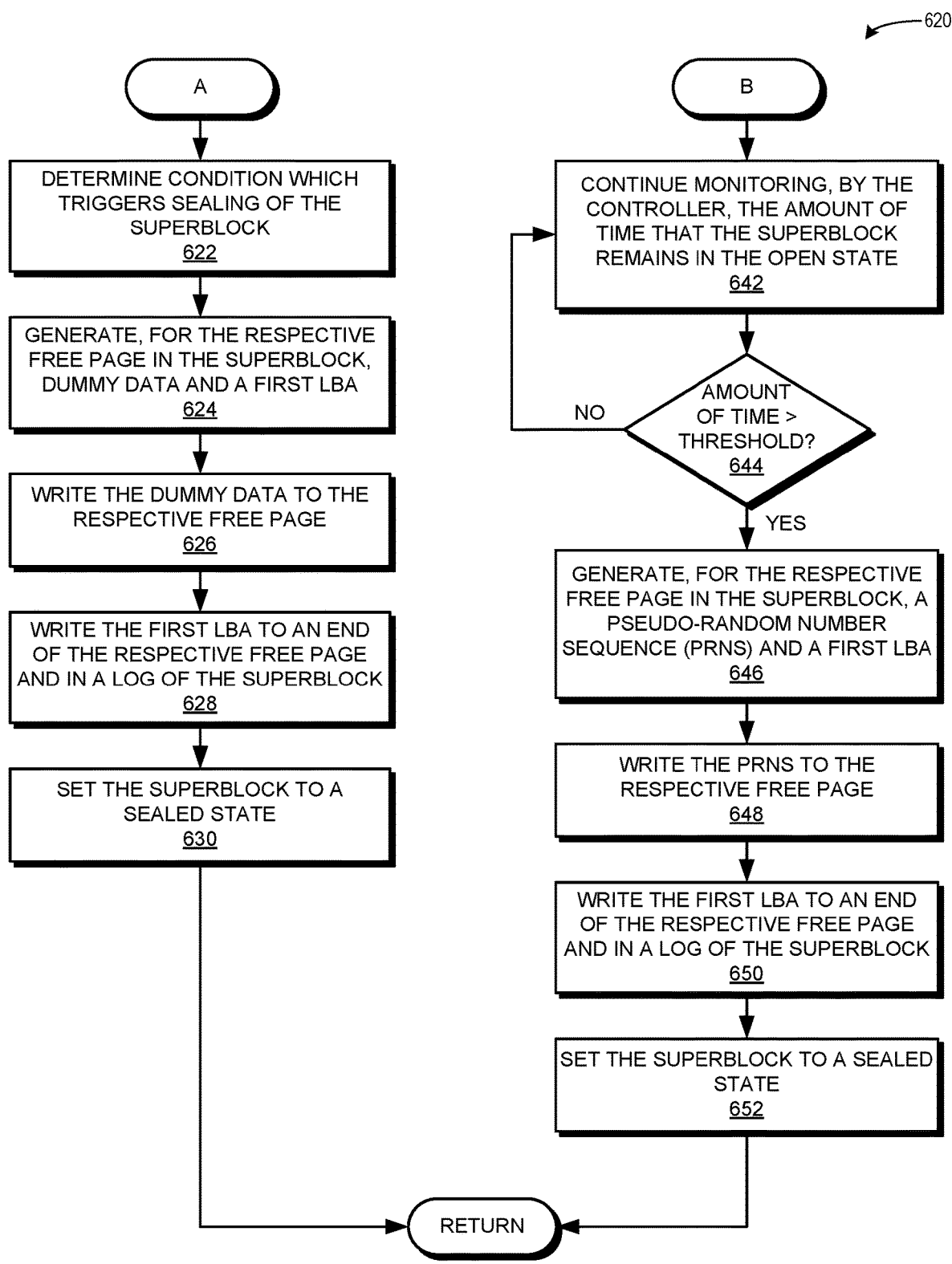
FIG. 6B presents a flowchart illustrating a method for facilitating data management, including block-sealing and bypass write operations, in accordance with an embodiment of the present application.

FIG. 6B presents a flowchart 620 illustrating a method for facilitating data management, including block-sealing and bypass write operations, in accordance with an embodiment of the present application. At Label A, the system determines, by the FTL module, a condition which triggers sealing the superblock (operation 622). The system generates, for the respective free page in the superblock, dummy data and a first LBA (operation 624). The system writes the dummy data to the respective free page (operation 626). The system writes the first LBA to an end of the respective free page and in a log of the superblock (operation 628). The first LBA indicates that the respective free page includes the pseudo-random number sequence, and the log comprises LBAs associated with the superblock. The system sets the superblock to a sealed state (operation 630). The dummy data and the first LBA are written directly to the respective free page while bypassing one or more data-processing modules, as described above in relation to FIG. 3 and bypass write 452 of FIG. 4. The operation returns.

At Label B, the system continues monitoring, by the controller, the amount of time that the superblock remains in the open state (operation 642). If the amount of time is not greater than a predetermined threshold (decision 644), the system returns to operation 642. If the amount of time is greater than the predetermined threshold (decision 644), the system generates, for the respective free page in the superblock, a pseudo-random number sequence (PRNS) and a first logical block address (LBA) (operation 646). The system writes the pseudo-random number sequence (PRNS) to the respective free page in the superblock (operation 648). The system writes the first LBA to an end of the respective free page and in a log of the superblock (operation 650). The first LBA indicates that the respective free page includes the pseudo-random number sequence, and the log comprises LBAs associated with the superblock. The system sets the superblock to a sealed state (operation 652), and the operation returns. The PRNS and the first LBA are written directly to the respective free page while bypassing one or more data-processing modules, as described above in relation to FIG. 3 and bypass write 452 of FIG. 4.

Thus, FIGS. 6A and 6B depict how the host-side FTL module handles the allocation of the superblocks (e.g., the open superblocks to which data can be written), while the controller monitors the condition of the open NAND blocks (e.g., the open time duration). If a normal write operation results in filling and sealing an entire superblock, the controller need not perform any data-filling or issue a block-sealing command. If the host-side FTL remains in normal operation (e.g., does not crash or experience a failure), the host-side FTL can continue to issue the block-sealing command, which results in filling free pages in an open superblock with dummy data and LBAs (e.g., "seal LBAs") which indicate that the page includes dummy data. If the host-side FTL crashes or experiences a failure, the controller (e.g., firmware indicated as the modules of block sealer 310 in FIG. 3) can take control, generate the PRNS, and write, to a respective free page, the PRNS and an LBA (e.g., a seal LBA) which indicates that the page includes the PRNS. Because the FTL may not be available during the host-side FTL crash or failure, the controller can store the seal LBA(s) in both the LBA log of a given individual superblock and at the end of the respective individual NAND page.

Exemplary Computer System and Apparatus

Figure 7:
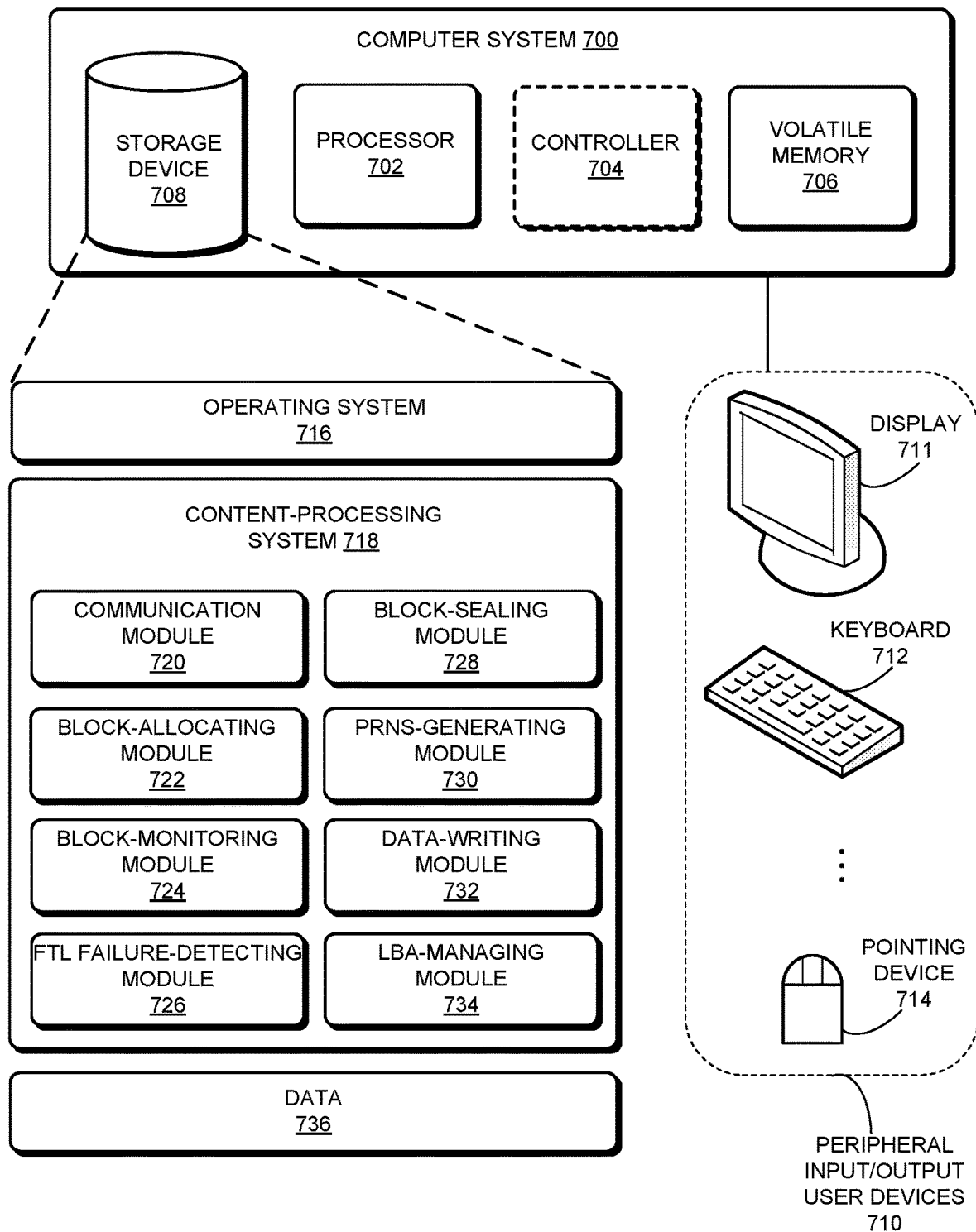
FIG. 7 illustrates an exemplary computer system that facilitates data management, in accordance with an embodiment of the present application.

FIG. 7 illustrates an exemplary computer system 700 that facilitates data management, in accordance with an embodiment of the present application. Computer system 700 includes a processor 702, a volatile memory 706, and a storage device 708. In some embodiments, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including data to be read or written, an input/output (I/O) request (e.g., a read request or a write request), metadata, an LBA, dummy data, and a pseudo-random number sequence (PRNS) (communication module 720).

Content-processing system 718 can further include instructions for allocating a superblock of a storage device, wherein the superblock is in an open state (block-allocating module 722). Content-processing system 718 can include instructions for writing data to the superblock (data-writing module 732). Content-processing system 718 can include instructions for monitoring, by a controller of the storage device, an amount of time that the superblock remains in the open state (block-monitoring module 724). Content-processing system 718 can include instructions for, responsive to detecting a failure associated with a flash translation layer (FTL) module (FTL failure-detecting module 726): determining that the monitored amount of time exceeds a predetermined threshold (block-monitoring module 724); and sealing, by the controller, the superblock by writing directly to a respective free page in the superblock while bypassing one or more data-processing modules (block-sealing module 728).

Content-processing system 718 can include instructions for generating, for the respective free page, a pseudo-random number sequence (PRNS) and a first logical block address (LBA) (PRNS-generating module 730 and LBA-managing module 734). Content-processing system 718 can include instructions for writing the pseudo-random number sequence to the respective free page in the superblock (data-writing module 732). Content-processing system 718 can include instructions for writing the first LBA to an end of the respective free page, wherein the first LBA indicates that the respective free page includes the pseudo-random number sequence (data-writing module 732). Content-processing system 718 can include instructions for writing the first LBA in a log of the superblock, wherein the log comprises LBAs associated with the superblock (LBA-managing module 734). Content-processing system 718 can include instructions for setting the superblock to a sealed state, wherein the pseudo-random number sequence and the first LBA are written directly to the respective free page while bypassing the one or more data-processing modules (block-monitoring module 724).

Data 736 can include any data that is required as input or generated as output by the methods and/or processes described in this disclosure. Specifically, data 736 can store at least: data; a request; a read request; a write request; an input/output (I/O) request; data or metadata associated with a read request, a write request, or an I/O request; a command; a block-sealing command; an indicator or identifier of a storage drive, a controller, or a module, unit, or component of a controller; an indicator of an FTL module; an indicator of a failure associated with the FTL module; an amount of time; a monitored amount of time; a predetermined threshold; a free page; a filled page; a block or superblock; a sealed or open state; dummy data; a pseudo-random number sequence; an LBA; a seal LBA; an invalid LBA; an LBA log; an identifier or indicator of a CRC module, a data-protecting module, a RAID-encoding module, an ECC-encoding module, or a data-modulating module; formatted data; encoded or decoded data; CRC data; CRC-checked data; ECC-encoded or ECC-decoded data; RAID-encoded or RAID-decoded data; and a condition which triggers sealing of an open block or superblock.

Figure 8:
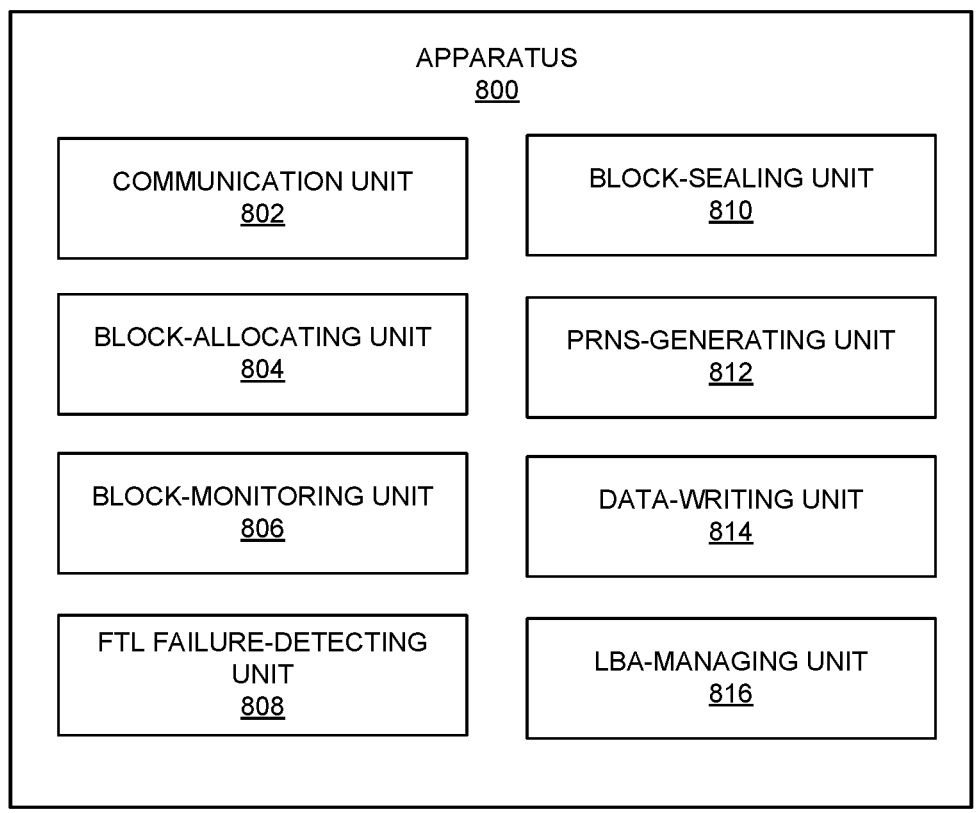
FIG. 8 illustrates an exemplary apparatus that facilitates data management, in accordance with an embodiment of the present application.

FIG. 8 illustrates an exemplary apparatus 800 that facilitates data management, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 can comprise modules or units 802-816 which are configured to perform functions or operations similar to modules 720-734 of computer system 700 of FIG. 7, including: a communication unit 802; a block-allocating unit 804; a block-monitoring unit 806; an FTL failure-detecting unit 808; a block-sealing unit 810; a PRNS-generating unit 812; a data-writing unit 814; and an LBA-managing unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
allocating a superblock of a storage device, wherein the superblock is in an open state;
writing data to the superblock;
monitoring, by a controller of the storage device, an amount of time that the superblock remains in the open state; and
responsive to detecting a failure associated with a flash translation layer (FTL) module:
determining that the monitored amount of time exceeds a predetermined threshold; and
sealing, by the controller, the superblock by writing directly to a respective free page in the superblock while bypassing one or more data-processing modules.

2. The method of claim 1, wherein sealing, by the controller, the superblock further comprises:
generating, for the respective free page, a pseudo-random number sequence and a first logical block address (LBA);
writing the pseudo-random number sequence to the respective free page in the superblock;
writing the first LBA to an end of the respective free page, wherein the first LBA indicates that the respective free page includes the pseudo-random number sequence;
writing the first LBA in a log of the superblock, wherein the log comprises LBAs associated with the superblock; and
setting the superblock to a sealed state,
wherein the pseudo-random number sequence and the first LBA are written directly to the respective free page while bypassing the one or more data-processing modules.

3. The method of claim 1, wherein the data-processing modules include one or more of:
a cyclic redundancy check (CRC) module;
a data-protecting module;
a redundant array of independent disks (RAID)-encoding module;
an error correction code (ECC)-encoding module; and
a data-modulating module.

4. The method of claim 1,
wherein the controller comprises a firmware component, which includes an operator component, a number generator, a watcher component, and a command component,
wherein monitoring the amount of time that the superblock remains in the open state is performed by the watcher component, and
wherein determining that the monitored amount of time exceeds the predetermined threshold is performed by the command component.

5. The method of claim 4, wherein responsive to the command component determining that the monitored amount of time exceeds the predetermined threshold, the method further comprises:
sending, by the command component to the operator component, a first command to seal the superblock;
sending, by the operator component in response to the first command, a second command for the number generator component; and
generating, by the number generator in response to the second command, the pseudo-random number sequence for the respective free page in the superblock.

6. The method of claim 1, wherein responsive to detecting no failure associated with the FTL module, the method further comprises:
determining, by the FTL module, a condition which triggers sealing the superblock;
generating, for the respective free page in the superblock, dummy data and a first LBA;
writing the dummy data to the respective free page;
writing the first LBA to an end of the respective free page, wherein the first LBA indicates that the respective free page includes the dummy data;
writing the first LBA in a log of the superblock, wherein the log comprises LBAs associated with the superblock; and
setting the superblock to a sealed state,
wherein the dummy data and the first LBA are written directly to the respective free page while bypassing the one or more data-processing modules.

7. The method of claim 1,
wherein allocating the superblock is performed by the FTL module, and
wherein the FTL module is associated with a host or an entity which is distinct from the storage device.

8. The method of claim 7,
wherein the superblock is allocated in response to a first incoming write request, and
wherein the data written to the superblock is associated with the first incoming write request.

9. The method of claim 8, further comprising:
responsive to processing a second incoming write request and determining that the superblock is full, allocating, by the FTL module, another superblock of the storage device to which to write data associated with the second incoming write request.

10. A computer system, comprising:
a processor; and
a memory coupled to the processor and storing instructions which, when executed by the processor, cause the processor to perform a method, the method comprising:
allocating a superblock of a storage device, wherein the superblock is in an open state;
writing data to the superblock;
monitoring, by a controller of the storage device, an amount of time that the superblock remains in the open state; and
responsive to detecting a failure associated with a flash translation layer (FTL) module:
determining that the monitored amount of time exceeds a predetermined threshold; and
sealing, by the controller, the superblock by writing directly to a respective free page in the superblock while bypassing one or more data-processing modules.

11. The computer system of claim 10, wherein sealing, by the controller, the superblock further comprises:

generating, for the respective free page, a pseudo-random number sequence and a first logical block address (LBA);

writing the pseudo-random number sequence to the respective free page in the superblock;

writing the first LBA to an end of the respective free page, wherein the first LBA indicates that the respective free page includes the pseudo-random number sequence;

writing the first LBA in a log of the superblock, wherein the log comprises LBAs associated with the superblock; and setting the superblock to a sealed state, wherein the pseudo-random number sequence and the first LBA are written directly to the respective free page while bypassing the one or more data-processing modules.

12. The computer system of claim 10, wherein the data-processing modules include one or more of:

a cyclic redundancy check (CRC) module;
a data-protecting module;
a redundant array of independent disks (RAID)-encoding module;
an error correction code (ECC)-encoding module; and
a data-modulating module.

13. The computer system of claim 10, wherein the controller comprises a firmware component, which includes an operator component, a number generator, a watcher component, and a command component, wherein monitoring the amount of time that the superblock remains in the open state is performed by the watcher component, and wherein determining that the monitored amount of time exceeds the predetermined threshold is performed by the command component.

14. The computer system of claim 13, wherein responsive to the command component determining that the monitored amount of time exceeds the predetermined threshold, the method further comprises:

sending, by the command component to the operator component, a first command to seal the superblock;

sending, by the operator component in response to the first command, a second command for the number generator component; and generating, by the number generator in response to the second command, the pseudo-random number sequence for the respective free page in the superblock.

15. The computer system of claim 10, wherein responsive to detecting no failure associated with the FTL module, the method further comprises:

determining, by the FTL module, a condition which triggers sealing the superblock;

generating, for the respective free page in the superblock, dummy data and a first LBA;

writing the dummy data to the respective free page;

writing the first LBA to an end of the respective free page, wherein the first LBA indicates that the respective free page includes the dummy data;

writing the first LBA in a log of the superblock, wherein the log comprises LBAs associated with the superblock; and setting the superblock to a sealed state, wherein the dummy data and the first LBA are written directly to the respective free page while bypassing the one or more data-processing modules.

16. The computer system of claim 10, wherein allocating the superblock is performed by the FTL module, and wherein the FTL module is associated with a host or an entity which is distinct from the storage device.

17. The computer system of claim 16, wherein the superblock is allocated in response to a first incoming write request, and wherein the data written to the superblock is associated with the first incoming write request.

18. The computer system of claim 17, wherein the method further comprises:

responsive to processing a second incoming write request and determining that the superblock is full, allocating, by the FTL module, another superblock of the storage device to which to write data associated with the second incoming write request.

19. An apparatus, comprising:

a block-allocating module configured to allocate a superblock of a storage device, wherein the superblock is in an open state;

a data-writing module configured to write data to the superblock;

a block-monitoring module configured to monitor an amount of time that the superblock remains in the open state;

an FTL failure-detecting module configured to detect a failure associated with a flash translation layer (FTL) module, wherein responsive to the FTL failure-detecting module detecting a failure associated with a flash translation layer (FTL) module, the block-monitoring module is configured to determine that the monitored amount of time exceeds a predetermined threshold; and a block-sealing module configured to seal the superblock by writing directly to a respective free page in the superblock while bypassing one or more data-processing modules.

20. The apparatus of claim 19, further comprising:

a pseudo-random number sequence-generating module configured to generate, for the respective free page, a pseudo-random number sequence;

an LBA-managing module configured to generate, for the respective page, a first logical block address (LBA), wherein the data-writing module is further configured to write the pseudo-random number sequence to the respective free page in the superblock and to write the first LBA to an end of the respective free page, and wherein the first LBA indicates that the respective free page includes the pseudo-random number sequence; and an LBA-managing module configured to write the first LBA in a log of the superblock, wherein the log comprises LBAs associated with the superblock, wherein the block-monitoring module is further configured to set the superblock to a sealed state, wherein the pseudo-random number sequence and the first LBA are written directly to the respective free page while bypassing the one or more data-processing modules.

* * * * *